United States Patent
Kedia et al.

(10) Patent No.: US 11,934,269 B2
(45) Date of Patent: *Mar. 19, 2024

(54) EFFICIENT STORAGE OF ERROR CORRECTING CODE INFORMATION

(71) Applicant: Cadence Design Systems, Inc., San Jose, CA (US)

(72) Inventors: Amit Kedia, Sunnyvale, CA (US); Kartik Dayalal Kariya, Bangalore (IN); Sreeja Menon, Bangalore (IN); Steven C. Woo, Saratoga, CA (US)

(73) Assignee: Cadence Design Systems, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/110,737

(22) Filed: Feb. 16, 2023

(65) Prior Publication Data

US 2023/0273857 A1 Aug. 31, 2023

Related U.S. Application Data

(63) Continuation of application No. 17/051,304, filed as application No. PCT/US2019/029591 on Apr. 29, 2019, now Pat. No. 11,609,816.

(Continued)

(51) Int. Cl.
*G06F 11/10* (2006.01)
*G06F 11/00* (2006.01)
(Continued)

(52) U.S. Cl.
CPC ...... *G06F 11/1076* (2013.01); *G06F 13/4027* (2013.01)

(58) Field of Classification Search
CPC ............ G06F 11/0715; G06F 11/0736; G06F 11/1004; G06F 11/1016; G06F 11/102; G06F 11/1076; G06F 13/4027
See application file for complete search history.

(56) References Cited

U.S. PATENT DOCUMENTS 7,117,421 B1 * 10/2006 Danilak .............. G06F 11/1008
714/763
7,519,894 B2 4/2009 Weis et al.
(Continued)

FOREIGN PATENT DOCUMENTS

WO WO-2016-049418 A1 3/2016
WO 2019/217118 A1 11/2019

OTHER PUBLICATIONS

EP Extended European Search Report dated Feb. 7, 2022 re: EP Appln. No. 19799935.2. 9 pages.
(Continued)

*Primary Examiner* — Justin R Knapp
(74) *Attorney, Agent, or Firm* — Mark H. Whittenberger; Holland & Knight LLP (57) ABSTRACT

Multiple independent point-to-point memory channels are operated, by at least one controller, in parallel to form a wider memory channel. The memory components on these point-to-point channels include the ability to connect to multiple (e.g., 2) instances of these independent memory channels. The controller operates multiple instances of the wider channels with the memory components configured in a clamshell mode. A single memory component is also operated in clamshell mode to provide error correction code information, independently of the other wider channels, to multiple instances of the wider memory channel.

20 Claims, 10 Drawing Sheets

Related U.S. Application Data (60) Provisional application No. 62/720,977, filed on Aug. 22, 2018, provisional application No. 62/670,582, filed on May 11, 2018.

(51) Int. Cl.
  *G06F 13/00* (2006.01)
  *G06F 13/40* (2006.01)

(56) References Cited

U.S. PATENT DOCUMENTS

| | | |
|---|---|---|
| 8,213,205 B2 | 7/2012 | Rajan |
| 8,352,805 B2 | 1/2013 | Shaeffer et al. |
| 8,473,791 B2 | 6/2013 | Shaw et al. |
| 8,555,116 B1 | 10/2013 | Shaeffer et al. |
| 8,582,339 B2 | 11/2013 | Rajan |
| 8,612,828 B2 | 12/2013 | Brzezinski |
| 8,707,110 B1 | 4/2014 | Shaelfer et al. |
| 8,917,571 B2 | 12/2014 | Chow et al. |
| 9,058,276 B2 | 6/2015 | Stephens et al. |
| 9,087,614 B2 | 7/2015 | Son et al. |
| 9,116,700 B2 | 8/2015 | Chinnakkonda Vidyapoornachary et al. |
| 9,116,702 B2 | 8/2015 | Chinnakkonda Vidyapoornachary et al. |
| 9,170,878 B2 | 10/2015 | Haywood et al. |
| 9,170,894 B2 | 10/2015 | Shaeffer et al. |
| 9,171,585 B2 | 10/2015 | Rajan et al. |
| 9,262,261 B2 | 2/2016 | Radke |
| 9,318,182 B2 | 4/2016 | Lovelace |
| 9,361,955 B2 | 6/2016 | Muralimanohar et al. |
| 9,507,739 B2 | 11/2016 | Rajan et al. |
| 9,824,010 B2 | 11/2017 | Brewer et al. |
| 9,842,021 B2 | 12/2017 | Halbert et al. |
| 9,870,283 B2 | 1/2018 | Shaeffer et al. |
| 9,916,873 B2 | 3/2018 | Giovannini et al. |
| 10,705,912 B2 | 7/2020 | Miller et al. |
| 2009/0154211 A1 | 6/2009 | Qu et al. |
| 2013/0342998 A1 | 12/2013 | Chen |
| 2014/0192583 A1 | 7/2014 | Rajan et al. |
| 2016/0092305 A1 | 3/2016 | Alam et al. |
| 2017/0103800 A1 | 4/2017 | Ware et al. |
| 2018/0046541 A1 | 2/2018 | Niu et al. |
| 2018/0336089 A1 | 11/2018 | Ware et al. |
| 2018/0357125 A1 | 12/2018 | Miller et al. |
| 2022/0101912 A1* | 3/2022 | Ware .................. G11C 7/02 |

OTHER PUBLICATIONS

International Search Report dated Jul. 9, 2019 re: Int'l Appln. No. PCT/US19/29591. 2 pages.

Written Opinion of the International Searching Authority dated Jul. 9, 2019 re: Int'l Appln. No. PCT/US19/29591. 7 pages.

* cited by examiner

EFFICIENT STORAGE OF ERROR CORRECTING CODE INFORMATION

DETAILED DESCRIPTION OF THE EMBODIMENTS

In an embodiment, multiple independent point-to-point memory channels (e.g., 16-bit memory channels) are operated, by a controller, in parallel to form a wider memory channel (e.g., a 64-bit data channel.) The memory components on these point-to-point channels include the ability to connect to multiple (e.g., 2) instances of these independent memory channels. In addition, pairs of these memory components may be affixed to opposite sides of a substrate (e.g., printed circuit board) and receive the same command/address signal lines from each of the memory channels. The data signal lines of these pairs are routed to the controller separately such that each memory component of the pair, when so configured, supplies one-half (½) of the data width of the memory channel (e.g., for a 16-bit memory channel, each component of the pair supplies 8 bits.) Configuring the pair to operate in this manner is known as 'clamshell' mode.

A single controller operates multiple instances of the wider channels (e.g., for increased memory bandwidth) with the memory components configured in the clamshell mode. A single memory component is also operated in clamshell mode to provide error correction code information, independently of the other wider channels, to multiple instances of the wider memory channel.

The single memory component uses the ability to connect to multiple (e.g., 2) instances of these independent memory channels to independently provide the error correction information to each of the wider channels. Thus, for example, two independent 72-bit channels (i.e., 64-bits of data and 8-bits of error correction code) may be provided using just nine (9) memory components—four (4) components on each of the two channels are for providing a total of 64-bits of data (in parallel) with the single memory component being 'shared' by the channels such that the single memory component provides 8 bits of error correction information to each of the channels.

Figure 1A:
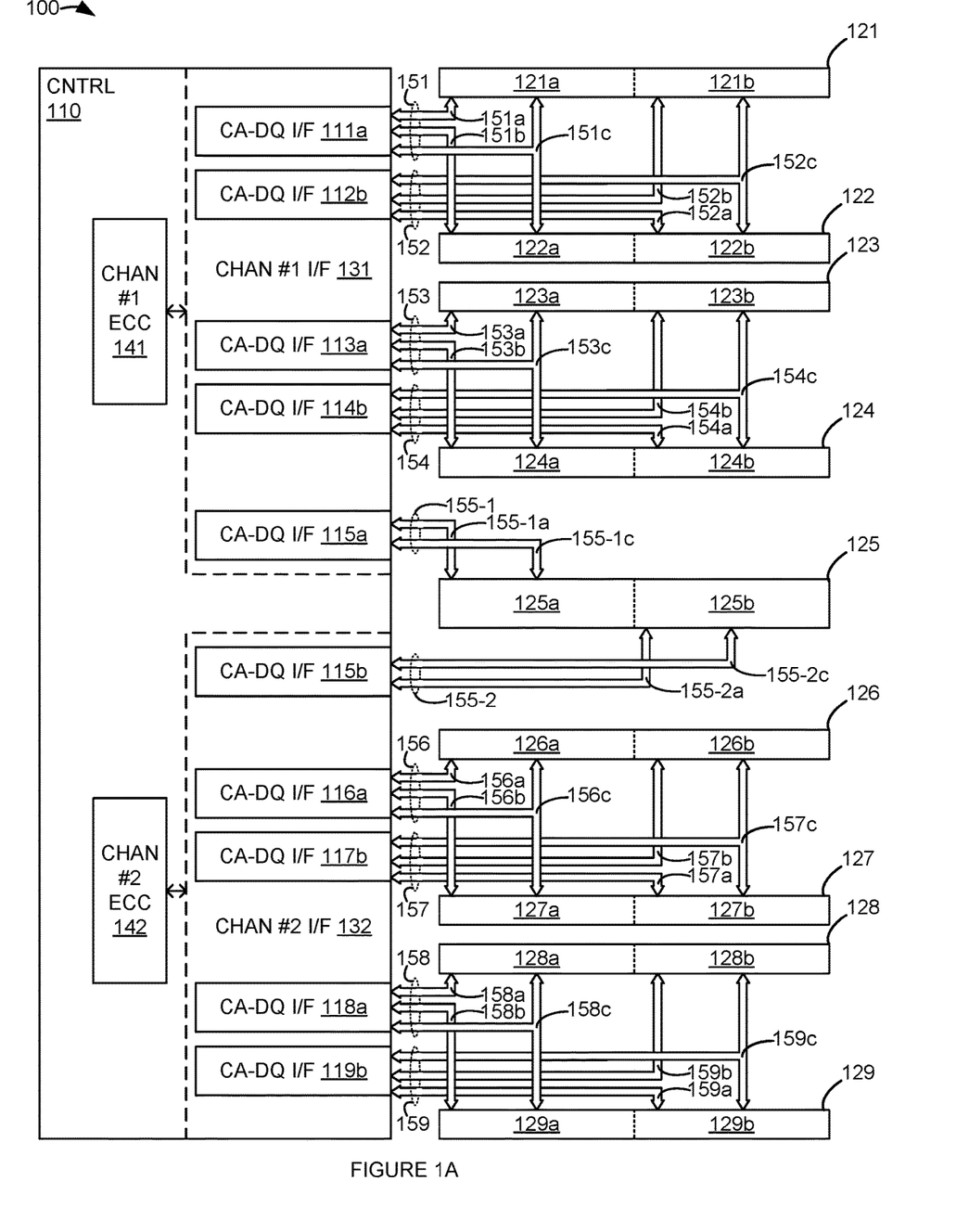
FIG. 1A is a block diagram illustrating a memory system.

FIG. 1A is a block diagram illustrating a memory system. In FIG. 1A, memory system 100 comprises memory controller 110, memory components 121-129, memory access channels 151-154, 155-1, 155-2, and 156-159. Controller 110 includes wide memory channel #1 interface 131, wide memory channel #2 interface 132, error correcting code (ECC) circuitry for channel #1 141 and ECC circuitry for channel #2 142. Wide memory channel #1 interface 131 includes memory access interfaces 111a, 112b, 113a, 114b, and 115a. Wide memory channel #2 interface 132 includes memory access interface 115b, 116a, 117b, 118a, and 119b.

Memory components 121-129 each have at least two independent memory access interfaces 121a-129a and 121b-129b, respectively. In other words, memory component 121 has at least two independent memory access interfaces 121a and 121b. Likewise, memory component 122 has at least two independent memory access interfaces 122a and 122b, and so on for the rest of memory components 123-129. Memory access interfaces 121a-129a and 121b-129b for a given memory component 121-129 are independent in that they can operate independently of each other to provide command, address, and data transfer functions to the respective memory access channels 151-154, 155-1, 155-2, and 156-159 that they are operatively coupled to. However, the memory access interfaces 121a-129a and 121b-129b on a respective memory component 121-129 may share at least one common signal, such as a clock and/or strobe signal(s).

Controller 110 and the memory components 121-129 may be integrated circuit type devices, such as are commonly referred to as a "chip". Memory components 121-129 may be standalone devices, or may be one or more components of a memory module. A memory controller, such as controller 110, manages the flow of data going to and from memory devices and/or memory modules. A memory controller can be a separate, standalone chip, or integrated into another chip. For example, a memory controller may be included on a single die with a microprocessor, or included as part of a more complex integrated circuit system such as a block of a system on a chip (SOC). Memory components 121-129 can include a dynamic random access memory (DRAM) core or other type of memory cores, for example, static random access memory (SRAM) cores, or non-volatile memory cores such as flash. In an embodiment, memory components 121-129 conform to the double data rate type six synchronous graphics dynamic random-access memory (GDDR6) specification.

As used herein, the terms related to error correction (e.g., ECC, ECC code, check bits, etc.) refer broadly to the generation and/or addition of redundancy (i.e., some extra data) to stored data, which can be used (e.g., by ECC circuitry 141 and/or ECC circuitry 142) to check the consistency of the retrieved data, and/or to recover data that has been determined to be corrupted. Thus, at least the terms ECC information and ECC code should be understood to include redundant information that merely checks for corruption (e.g., parity so that retrieval may be retried) as well as more complex error detection/correction schemes such as checksums, cyclic redundancy checks (CRC—e.g., CRC-8), and forward error correction schemes.

Controller 110 is operatively coupled to the memory access interfaces 121a-129a and 121b-129b on a respective memory component 121-129 via respective memory access channels 151-154, 155-1, 155-2, and 156-159 to communicate commands, addresses, and data with memory devices 121-129. Memory access channels 151-154 and 156-159 respectively comprise first bidirectional data signals (e.g., DQ[0:7]) 151a-154a and 156a-159a, second bidirectional data signals (e.g., DQ[8:15]) 151b-154b and 156b-159b, and command/address (CA or C/A) signals 151c-154c and 156c-159c. Memory access channels 155-1 and 155-2 respectively comprise bidirectional data signals (e.g., DQ[0:7]) 155-1a and 155-2a, and command/address (CA or C/A) signals 155-1c and 155-2c.

Controller 110 can operate, via memory access channels 151-154, 155-1, 155-2, and 156-159, each respective independent portion (e.g., memory access interfaces 121a-129a and 121b-129b) of memory components 121-129 independently. Each of memory access interfaces 111a, 112b, 113a, 114b, 115a, 115b, 116a, 117b, 118a, and 119b, and thus each of memory access channels 151-154, 155-1, 155-2, and 156-159 include command, address, and data transfer functions.

Each of memory access interfaces 111a, 112b, 113a, 114b, 115a, 115b, 116a, 117b, 118a, and 119b may operate the command, address, and data transfer functions of their respective memory access channel 151-154, 155-1, 155-2, and 156-159 independently of the other memory access channels 151-154, 155-1, 155-2, and 156-159. Memory access interfaces 111a, 112b, 113a, 114b, 115a, 115b, 116a, 117b, 118a, and 119b may be operated independently of each other because the memory access interfaces 121a-129a and 121b-129b can operate independently of the other memory access interfaces 121a-129a and 121b-129b and other memory components 121-129.

In an embodiment, memory access interfaces 111a, 112b, 113a, 114b, and 115a are effectively operated in 'lockstep' (i.e., receiving the same command and address information for what is effectively the same access cycles) to form wide memory channel #1 interface 131. Memory access interfaces 115b, 116a, 117b, 118a, and 119b are effectively operated in lockstep to form wide memory channel #2 interface 132.

Wide memory channel #1 interface 131 is operatively coupled to ECC circuitry 141. Wide memory channel #2 interface 132 is operatively coupled to ECC circuitry 142. The data communicated via wide memory channel #1 interface 131 is provided to ECC circuitry 141. The data communicated via wide memory channel #1 interface 131 may be corrected by ECC circuitry 141. The check bits communicated via wide memory channel #1 interface 131 are either generated by, or checked by, ECC circuitry 141. In an embodiment, ECC circuitry 141 can correct a single bit error in the data and check bits. ECC circuitry 141 may also be able to detect two or more bit errors in the data and check bits. Data, corrected data, and/or check bits processed by wide memory channel #1 interface 131 and/or ECC circuitry 141 may be output or otherwise used by controller 110.

The data communicated via wide memory channel #2 interface 132 is provided to ECC circuitry 142. The data communicated via wide memory channel #2 interface 132 may be corrected by ECC circuitry 142. The check bits communicated via wide memory channel #2 interface 132 are either generated by, or checked by, ECC circuitry 142. In an embodiment, ECC circuitry 142 can correct a single bit error in the data and check bits. ECC circuitry 142 may also be able to detect two or more bit errors in the data and check bits. Data, corrected data, and/or check bits processed by wide memory channel #2 interface 132 and/or ECC circuitry 142 may be output or otherwise used by controller 110. In an embodiment, the ECC scheme (code) implemented by ECC circuitry 141 and ECC circuitry 142 are the same. In an embodiment, the ECC scheme (code) implemented by ECC circuitry 141 and ECC circuitry 142 are not the same.

Memory components 121-124 and 126-129 (i.e., not memory component 125) may be paired. When paired, memory components 121-124 and 126-129 may be affixed to opposite sides of a substrate (e.g., printed circuit board). These pairs are operatively coupled (e.g., connected) to receive the same command/address signal lines from a respective pair of memory access channels 151-154, and 156-159. In other words, memory component 121 (via memory access interface 121a) and memory component 122 (via memory access interface 122a) are both connected to, command/address signal lines 151c of memory access channel 151 (and thus connected to memory access interface 111a.) Memory component 121 (via memory access interface 121a) and memory component 122 (via memory access interface 122a) are also both connected to, command/address signal lines 152c of memory access channel 152 (and thus connected to memory access interface 112b.) Memory components 123 and 124 are paired and connected in the same manner to each other and memory access interfaces 113a and 114b—and so on such that memory components 126 and 127 are paired and connected, as are memory components 128 and 129.

The data signal lines of these pairs are routed to the controller separately such that each memory component of the pair, when so configured, supplies a fraction (e.g., ½) of the data width of the memory channel (e.g., for a 16-bit memory channel, each component of the pair supplies 8 bits.) Thus, memory component 121 (via memory access interface 121a) is connected to memory access interface 111a using first data signal lines 151a of memory access channel 151. Memory component 122 (via memory access interface 122a) is connected to memory access interface 111a using second data signal lines 151b of memory access channel 151. Memory component 121 (via memory access interface 121b) is also connected to memory access interface 112b using second data signal lines 152b of memory access channel 152. Memory component 122 (via memory access interface 122b) is connected to memory access interface 112b using first data signal lines 152a of memory access channel 151. The first and second data signals of memory components 123 and 124 are connected in the same manner to memory access interfaces 113a and 114b—and so on such that the first and second data signals of memory components 126 and 127 are connected to memory access interfaces 116a and 117b, and the first and second data signals of memory components 128 and 129 are connected to memory access interfaces 118a and 119b. Configuring a pair to operate in this manner is known as 'clamshell' mode.

The command/address signal lines 155-1c of memory access channel 155-1 are connected to memory access interface 115a and memory access interface 125a of memory component 125. The data signal lines 155-1a of memory access channel 155-1 are connected to memory access interface 115a and memory access interface 125a of memory component 125. The command/address signal lines 155-2c of memory access channel 155-2 are connected to memory access interface 115b and memory access interface 115b of memory component 125. The data signal lines 155-2a of memory access channel 155-2 are connected to memory access interface 115b and memory access interface 125b of memory component 125.

Figure 1B:
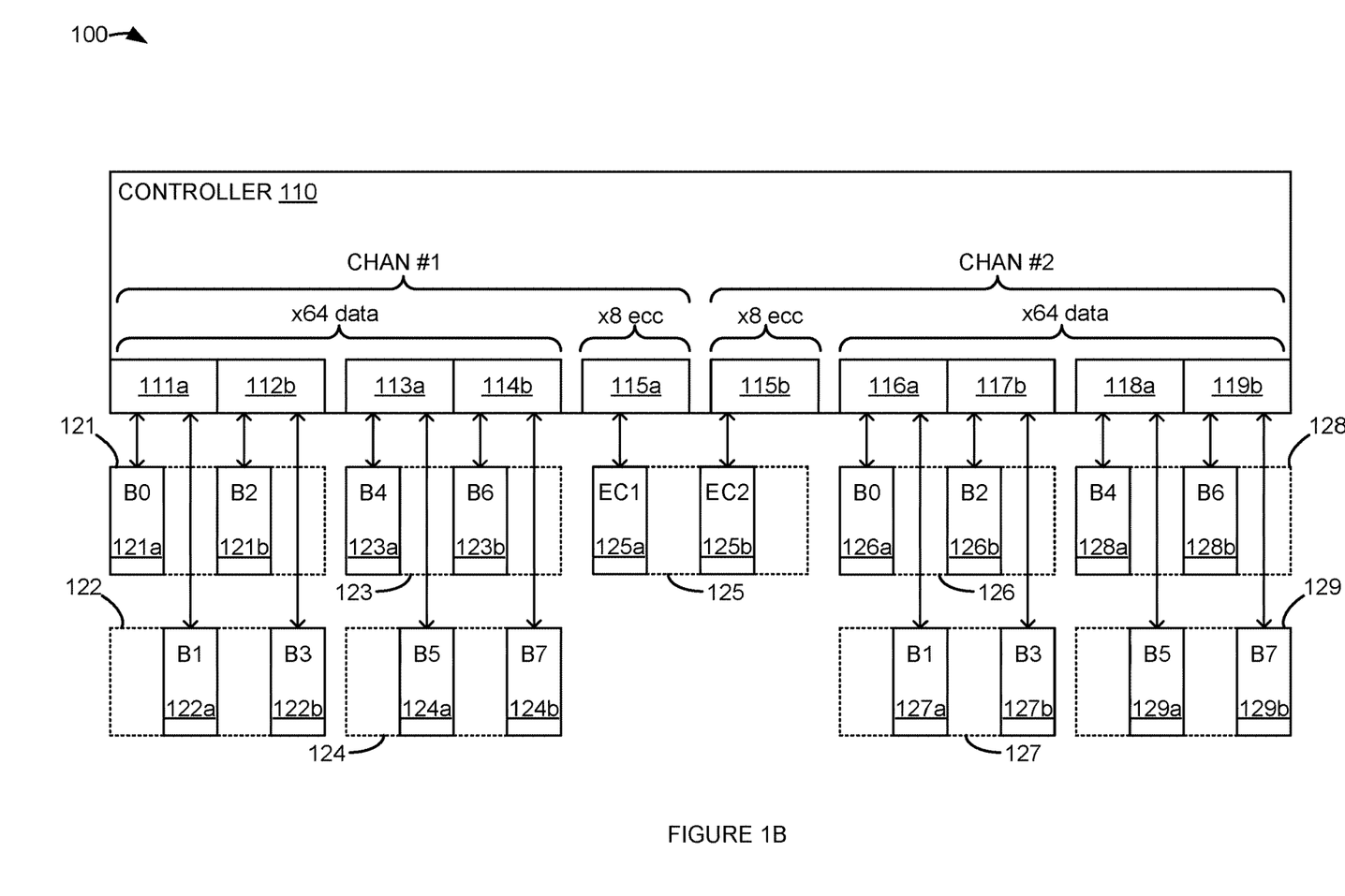
FIG. 1B is a block diagram illustrating memory data channel connections and a memory system.

The clamshell configuration of memory components 121-129 is further illustrated in FIG. 1B. For clarity, in FIG. 1B, the command/address portions 151c-154c, 155-1c, 155-2c, and 156c-159c of memory access channels 151-154, 155-1, 155-2, and 156-159 have been omitted. FIG. 1B illustrates that: memory access interface 121a of memory component 121 communicates data B0 (e.g., a byte) with memory access interface 111a; memory access interface 122a of memory component 122 communicates data B1 with memory access interface 111a; memory access interface 121b of memory component 121 communicates data B2 with memory access interface 112*b*; memory access interface 122*b* of memory component 122 communicates data B3 with memory access interface 112*b*. Paired memory components 123-124, 126-127, and 128-129 are connected in the same manner. Thus, for wide memory channel #1 interface 131: memory access interfaces 123*a* and 124*a* communicate data B4 and B5, respectively with memory access interface 113*a*; and, memory access interfaces 123*b* and 124*b* communicate data B6 and B7, respectively with memory access interface 114*b*. For wide memory channel #2 interface 132: memory access interfaces 126*a* and 127*a* communicate data B0 and B1, respectively with memory access interface 116*a*; memory access interfaces 126*b* and 127*b* communicate data B2 and B3, respectively with memory access interface 117*b*; memory access interfaces 128*a* and 129*a* communicate data B4 and B5, respectively with memory access interface 118*a*; memory access interfaces 128*b* and 129*b* communicate data B6 and B7, respectively with memory access interface 119*b*.

Memory component 125 is also operated in clamshell mode to provide respective error correction code information to wide memory channel #1 interface 131 and wide memory channel #2 interface 132. The ability of memory component 125 to independently be operated by multiple (i.e., 2) instances of wide memory channel interfaces 131-132 (i.e., via memory access interface 125*a* which is independent of memory access interface 125*b*) allows memory component 125 to independently provide the error correcting information (EC1 and EC2, respectively) to each of these wider channels 131-132. Thus, two independent 72-bit channels (i.e., 64-bits of data and 8-bits of error correction code) may be provided using just nine (9) memory components. Four memory components 121-124 on wide memory channel #1 interface 131 provide 64-bits of data and one-half (½) of memory component 125 provides 8 bits of error correction code data for a total of 72 bits. Likewise, four memory components 126-129 on wide memory channel #2 interface 132 provide 64-bits of data and the other one-half (½) of memory component 125 provides 8 bits of error correction code data for a second total of 72 bits.

In FIGS. 1A and 1B, each memory component 121-129 has two (2) independent memory access interfaces. However, it should be understood that the principles and techniques described herein can be applied to memory components and/or controllers that have more than two independent memory access interfaces.

In an embodiment, controller 100 includes a plurality of memory channel interfaces (e.g., memory channel #1 interface 131 and memory channel #2 interface 132.) These memory channel interfaces each include a respective plurality of memory access interfaces (e.g., memory channel #1 interface 131 includes memory access interfaces 111*a*, 112*b*, 113*a*, 114*b*, and 115*a*; memory channel #2 interface 132 includes memory access interface 115*b*, 116*a*, 117*b*, 118*a*, and 119*b*.) These memory access interfaces operate independently of the other memory access interfaces.

The memory channel interfaces include at least a first group of interfaces (i.e., memory access interfaces 111*a*, 112*b*, 113*a*, and 114*b*) to access a first data word group, and a second group (i.e., memory access interfaces 116*a*, 117*b*, 118*a*, and 119*b*) to access a second data word group. The memory channel interfaces also include at least a first error correction memory access interface (i.e., memory access interface 115*a*) and a second error correction memory access interface (i.e., memory access interface 115*b*.) The first error correction memory access interface and the second error correction memory access interface access the same memory component (i.e., memory component 125). The first error correction memory access interface (i.e., memory access interface 115*a*) accesses a first group of check bits associated with the first data word group. The second error correction memory access interface (i.e., memory access interface 115*b*) accesses a second group of check bits associated with the second data word group.

The memory access interfaces (i.e., memory access interfaces 111*a*, 112*b*, 113*a*, 114*b*, 115*a*, 115*b*, 116*a*, 117*b*, 118*a*, and 119*b*) each include command, address, and data transfer functions that operate independently of the command, address, and data transfer functions of the other memory access interfaces. In an embodiment, all of the memory components connected to the memory access interfaces are operated in clamshell mode.

Figure 2:
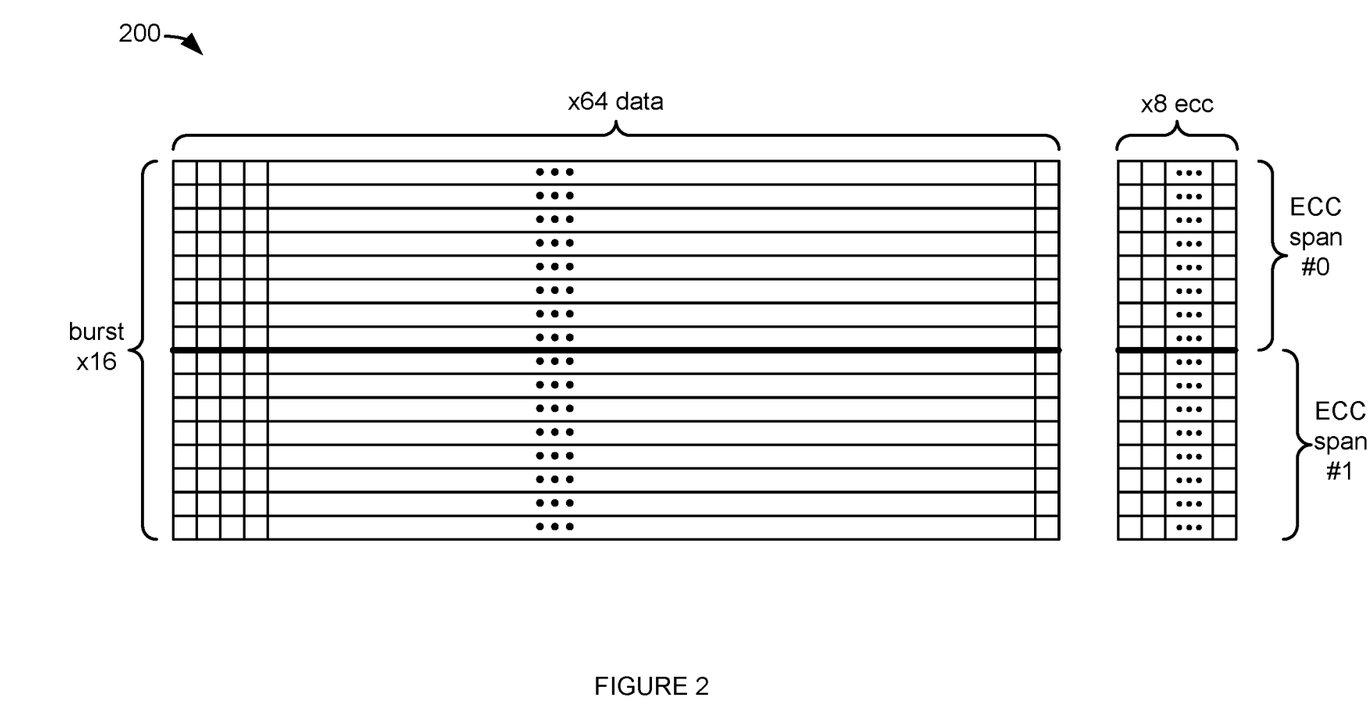
FIG. 2 is an illustration of a 64-bit wide data channel burst with error correction information.

FIG. 2 is an illustration of a 64-bit wide data channel burst with error correction information. The data channel burst illustrated in FIG. 2 may be received or transmitted by wide memory channel #1 interface 131 and/or wide memory channel #2 interface 132.

In FIG. 2, data channel burst 200 has a burst length of 16 groups of data. Each group of data has 64 data bits and 8 error correction code bits (i.e., check bits.) In an embodiment, each set of check bits is associated (i.e., provides error detection and correction for) with the corresponding 64 data bits in the same group of data. In another embodiment, the check bits for each half (i.e., ECC span #0 and ECC span #1) of the data burst are aggregated to provide error correction information for the corresponding half of the respective data burst. In another embodiment, the check bits for the entire data burst are aggregated to provide error correction information for the entire data burst.

Figure 1C:
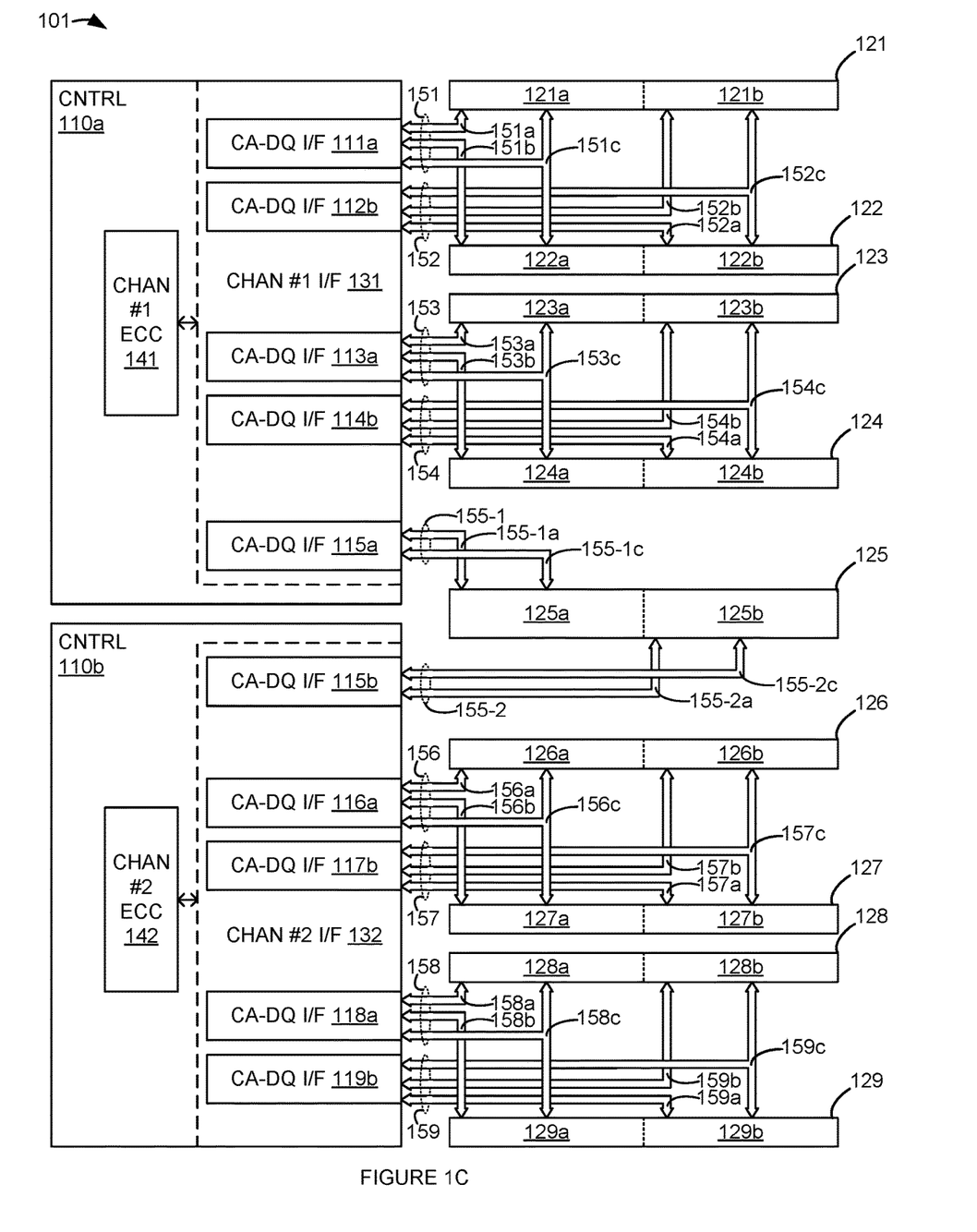
FIG. 1C is a block diagram illustrating memory data channel connections and a memory system with multiple controllers.

In FIGS. 1A and 1B, a single controller 110 is illustrated as controlling both wide memory channel #1 interface 131 and wide memory channel #2 interface 132. However, it is contemplated that multiple memory controllers 110*a* and 110*b* may independently control wide memory channel #1 interface 131 and wide memory channel #2 interface 132. This is illustrated in FIG. 1C by memory system 101 having controller 110*a* controlling wide memory channel #1 interface 131 and controller 110*b* controlling wide memory channel #2 interface 132. Controllers 110*a* and 110*b* may be on the same integrated circuit substrate.

Figure 3:
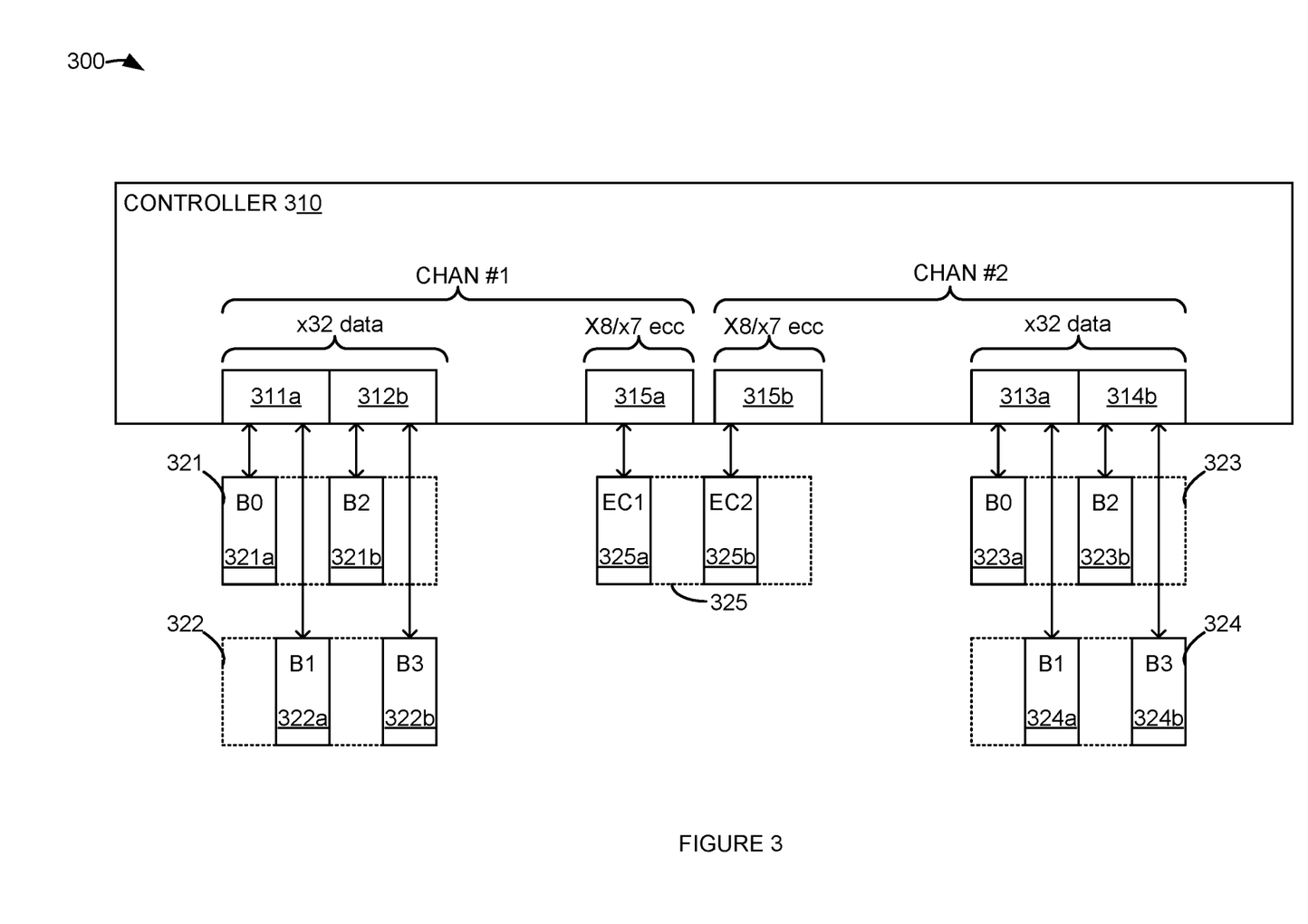
FIG. 3 is a block diagram illustrating memory data channel connections and a memory system.

FIG. 3 is a block diagram illustrating memory data channel connections and a memory system. In FIG. 3, memory system 300 comprises memory controller 310, memory components 321-325. Controller 310 includes wide memory channel #1 interface, and wide memory channel #2 interface. Wide memory channel #1 interface includes memory access interfaces 311*a*, 312*b*, and 315*a*. Wide memory channel #2 interface includes memory access interface 315*b*, 313*a*, and 314*b*.

Memory components 321-325 each have at least two independent memory access interfaces 321*a*-325*a* and 321*b*-325*b*, respectively. In other words, memory component 321 has at least two independent memory access interfaces 321*a* and 321*b*. Likewise, memory component 322 has at least two independent memory access interfaces 322*a* and 322*b*, and so on for the rest of memory components 323-325. Memory access interfaces 321*a*-325*a* and 321*b*-325*b* for a given memory component 321-325 are independent in that they can operate independently of each other to provide command, address, and data transfer functions to the respective memory access channel that they are operatively coupled to. However, the memory access interfaces 321*a*-325*a* and 321*b*-325*b* on a respective memory component 321-325 may share at least one common signal, such as a clock and/or strobe signal(s). Memory components 321-325 can include a dynamic random access memory (DRAM) core or other type of memory cores, for example, static random access memory (SRAM) cores, or non-volatile memory cores such as flash.

Memory access interfaces 311a, 312b, and 315a are effectively operated in 'lockstep' (i.e., receiving the same command and address information for what is effectively the same access cycles) to form wide memory channel #1 interface. Memory access interfaces 315b, 313a, and 314b are effectively operated in lockstep to form wide memory channel #2 interface.

Memory components 321, 322, 323, and 324 (i.e., not memory component 325) may be paired. When paired, memory components 321, 322, 323, and 324 may be affixed to opposite sides of a substrate (e.g., printed circuit board). These pairs are operatively coupled (e.g., connected) to receive the same command/address signal lines from controller 310. In other words, memory component 321 is connected to, via memory access interface 321a, the same command/address signal lines of controller 310 (i.e., connected to memory access interface 311a) as memory component 322 is connected to, via memory access interface 322a. Memory component 321 is also connected to, via memory access interface 321b, to the same command/address signal lines of controller 310 (and thus connected to memory access interface 312b as memory component 322 is connected to, via memory access interface 322b. Memory components 323 and 324 are paired and connected in the same manner to each other and memory access interfaces 313a and 314b.

The clamshell configuration of memory components 321-324 is illustrated in FIG. 3. For clarity, in FIG. 3, the command/address portions of the connections between controller 310 and memory components 321-325 have been omitted. FIG. 3 illustrates that: memory access interface 321a of memory component 321 communicates data B0 (e.g., a byte) with memory access interface 311a; memory access interface 322a of memory component 322 communicates data B1 with memory access interface 311a; memory access interface 321b of memory component 321 communicates data B2 with memory access interface 312b; memory access interface 322b of memory component 322 communicates data B3 with memory access interface 312b. Paired memory components 323 and 324 are connected in the same manner. Thus, for wide memory channel #2 interface 323: memory access interfaces 323a and 324a communicate data B0 and B1, respectively with memory access interface 313a; memory access interfaces 323b and 324b communicate data B2 and B3, respectively with memory access interface 314b.

Memory component 325 is also operated in clamshell mode to provide respective error correction code data to wide memory channel #1 interface and wide memory channel #2 interface. The ability of memory component 325 to independently be operated by multiple (i.e., 2) instances of wide memory channel interfaces (i.e., via memory access interface 325a which is independent of memory access interface 325b) allows memory component 325 to independently provide the error correction information (EC1 and EC2, respectively) to each of these wider channels. Thus, two independent 39 or 40-bit channels (i.e., 32-bits of data and 7-bits of error correction code or 32-bits of data and 8-bits of error correction code) may be provided using just five (5) memory components. Two memory components 321 and 322 on wide memory channel #1 interface provide 32-bits of data and one-half (½) of memory component 325 provides either 7 or 8 bits (depending upon a desired configuration and/or ECC coding scheme) of error correcting code data for a total of either 39 or 40-bits, respectively. Likewise, two memory components 323 and 324 on wide memory channel #2 interface provide 32-bits of data and one-half (½) of memory component 325 provides either 7 or 8 bits (depending upon a desired configuration and/or ECC coding scheme) of error correcting code data for a total of either 39 or 40-bits, respectively.

Figure 4:
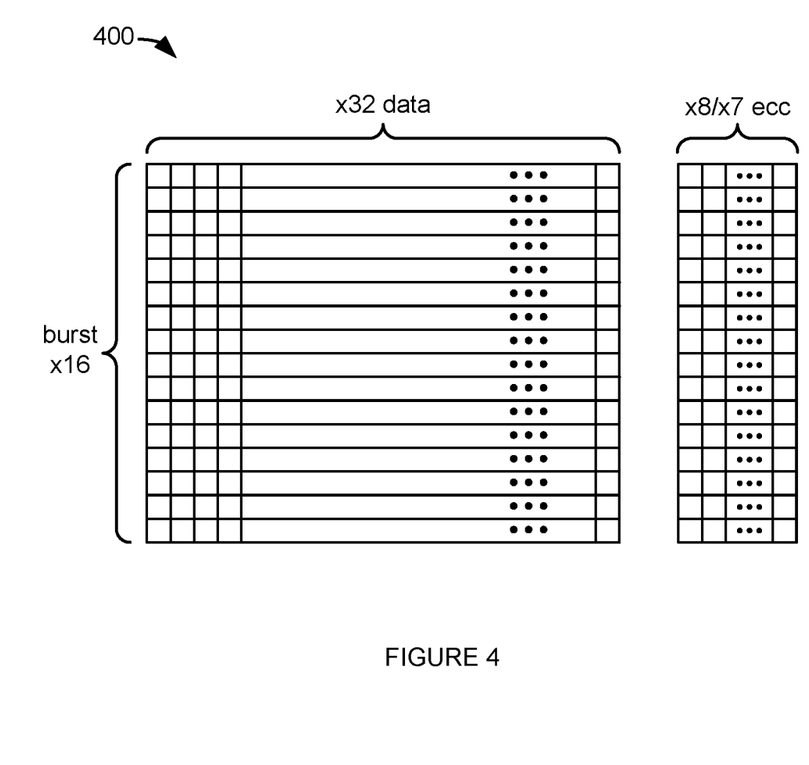
FIG. 4 is an illustration of a 32-bit wide data channel burst with error correction information.

FIG. 4 is an illustration of a 32-bit wide data channel burst with error correction information. The data channel burst illustrated in FIG. 4 may be received or transmitted by wide memory channel #1 interface and/or wide memory channel #2 interface of controller 310.

In FIG. 4, data channel burst 400 has a burst length of 16 groups of data. Each group of data has 32 data bits and either 7 or 8 error correction code bits (i.e., check bits.) In an embodiment, each set of check bits is associated (i.e., provides error detection and correction for) with the corresponding 32 data bits in the same group of data. In another embodiment, the check bits for half of the data burst are aggregated to provide error correction information for the corresponding half of the respective data burst. In another embodiment, the check bits for the entire data burst are aggregated to provide error correction information for the entire data burst.

Figure 5:
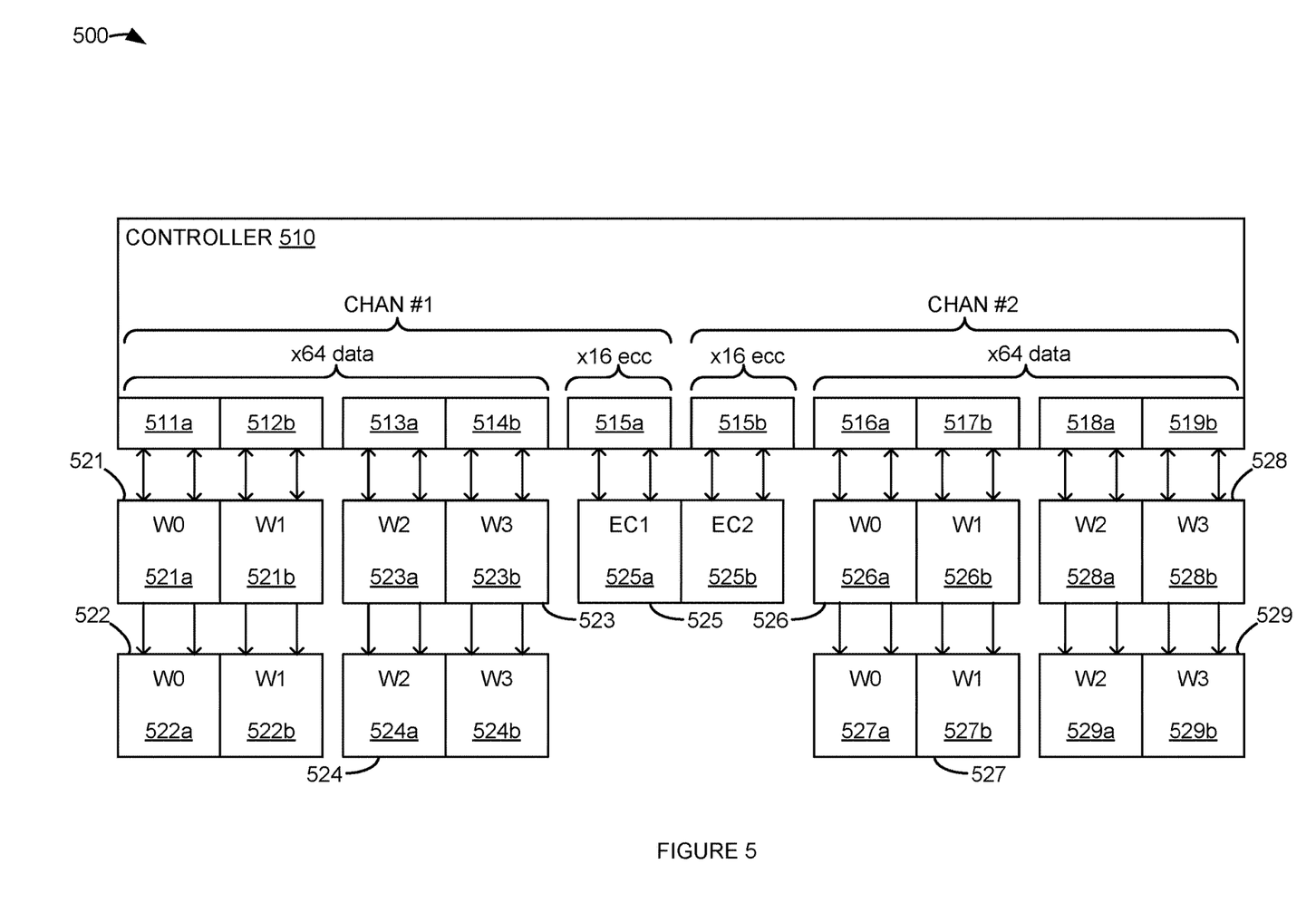
FIG. 5 is a block diagram illustrating a low-power double-data rate (LPDDR) memory system with error correction information.

FIG. 5 is a block diagram illustrating a low-power double-data rate (e.g., LPDDR4) memory system with error correction information. In FIG. 5, memory system 500 comprises memory controller 510 and memory components 521-529. Controller 510 includes wide memory channel #1 interface and wide memory channel #2 interface. Wide memory channel #1 interface includes memory access interfaces 511a, 512b, 513a, 514b, and 515a. Wide memory channel #2 interface includes memory access interface 515b, 516a, 517b, 518a, and 519b.

Memory components 521-529 each have at least two independent memory access interfaces 521a-529a and 521b-529b, respectively. In other words, memory component 521 has at least two independent memory access interfaces 521a and 521b. Likewise, memory component 522 has at least two independent memory access interfaces 522a and 522b, and so on for the rest of memory components 523-529. Memory access interfaces 521a-529a and 521b-529b for a given memory component 521-529 are independent in that they can operate independently of each other to provide command, address, and data transfer functions to the respective memory access channels that they are operatively coupled to. However, the memory access interfaces 521a-529a and 521b-529b on a respective memory component 521-529 may share at least one common signal, such as a clock and/or strobe signal(s). Memory components 521-529 can include a dynamic random access memory (DRAM) core or other type of memory cores, for example, static random access memory (SRAM) cores, or non-volatile memory cores such as flash.

Controller 510 is operatively coupled to the memory access interfaces 521a-529a and 521b-529b on a respective memory component 521-529 via respective memory access channels to communicate commands, addresses, and data with memory devices 521-529. Controller 510 can operate each respective independent portion (e.g., memory access interfaces 521a-529a and 521b-529b) of memory components 521-529 independently. Each of memory access interfaces 511a, 512b, 513a, 514b, 515a, 515b, 516a, 517b, 518a, and 519b include command, address, and data transfer functions.

Each of memory access interfaces 511a, 512b, 513a, 514b, 515a, 515b, 516a, 517b, 518a, and 519b may operate the command, address, and data transfer functions independently of the other of memory access interfaces 511a, 512b, 513a, 514b, 515a, 515b, 516a, 517b, 518a, and 519b. Memory access interfaces 511a, 512b, 513a, 514b, 515a, 515b, 516a, 517b, 518a, and 519b may be operated independently of each other because the memory access interfaces 521a-529a and 521b-529b can operate independently of the other memory access interfaces 521a-529a and 521b-529b and other memory components 521-529.

In an embodiment, memory access interfaces 511a, 512b, 513a, 514b, and 515a are effectively operated in 'lockstep' (i.e., receiving the same command and address information for what is effectively the same access cycles) to form wide memory channel #1 interface. Memory access interfaces 515b, 516a, 517b, 158a, and 519b are effectively operated in lockstep to form wide memory channel #2 interface.

In an embodiment, memory components 521-524 and 526-529 (i.e., not memory component 525) may be paired. When paired, memory components 521-524 and 526-529 may be affixed to opposite sides of a substrate (e.g., printed circuit board). These pairs are operatively coupled (e.g., connected) to receive the same command/address signal lines from a respective memory access channel—except for the chip select (CS) signal which is used to determine which devices (e.g., side of board, rank) are to provide the data to controller 510. In other words, memory component 521 is connected to, via memory access interface 521a, the same (except for CS) command/address signal lines of memory access interface 511a as memory component 522 is connected to, via memory access interface 522a. Memory component 521 is also connected to, via memory access interface 521b, the same (except for CS) command/address signal lines of memory access interface 512b as memory component 522 is connected to, via memory access interface 522b. Memory components 523 and 524 are paired and connected in the same manner to each other and memory access interfaces 513a and 514b—and so on such that memory components 526 and 527 are paired and connected, as are memory components 528 and 529.

The data signal lines of these pairs are routed to the controller together such that each memory component of the pair, supplies the whole data width of the memory channel (e.g., for a 16-bit memory channel, each component of the pair supplies 16 bits.)

The (non-clamshell) configuration of memory components 521-529 is illustrated in FIG. 5. For clarity, in FIG. 5, the command/address portions of the memory access channels have been omitted. FIG. 5 illustrates that: memory access interface 521a of memory component 521 communicates data W0 (e.g., a 16-bit word) with memory access interface 511a; memory access interface 522a of memory component 522 also communicates data W0 with memory access interface 511a (as determined by the CS signal); memory access interface 521b of memory component 521 communicates data W1 with memory access interface 512b; memory access interface 522b of memory component 522 also communicates data W1 with memory access interface 512b (as determined by the CS signal). Paired memory components 523-524, 526-527, and 528-529 are connected in the same manner. Thus, for wide memory channel #1 interface: memory access interfaces 523a and 524a communicate data W2 with memory access interface 513a; and, memory access interfaces 523b and 524b communicate data W3 with memory access interface 514b. For wide memory channel #2 interface: memory access interfaces 526a and 527a communicate data W0 with memory access interface 516a; memory access interfaces 526b and 527b communicate data W1 with memory access interface 517b; memory access interfaces 528a and 529a communicate data W2 with memory access interface 518a; memory access interfaces 528b and 529b communicate data W3 with memory access interface 519b.

Memory component 525 is operated to provide respective error correction code data to wide memory channel #1 interface and wide memory channel #2 interface. The ability of memory component 525 to independently be operated by multiple (i.e., 2) instances of wide memory channel interfaces (i.e., via memory access interface 525a which is independent of memory access interface 525b) allows memory component 525 to independently provide the error correcting information (EC1 and EC2, respectively) to each of these wider channels. Thus, two independent 72-bit channels (i.e., 64-bits of data and 8-bits of error correction code) may be provided using just nine (9) memory components. However, because memory component 525 supplies word-wide (e.g. 16-bits) of data (due to not being in, and/or having, a clamshell mode), controller 510 must manage which portion (e.g., byte) of the ECC word is used. Controller 510 may select the portion used based on the address being accessed.

Figure 6:
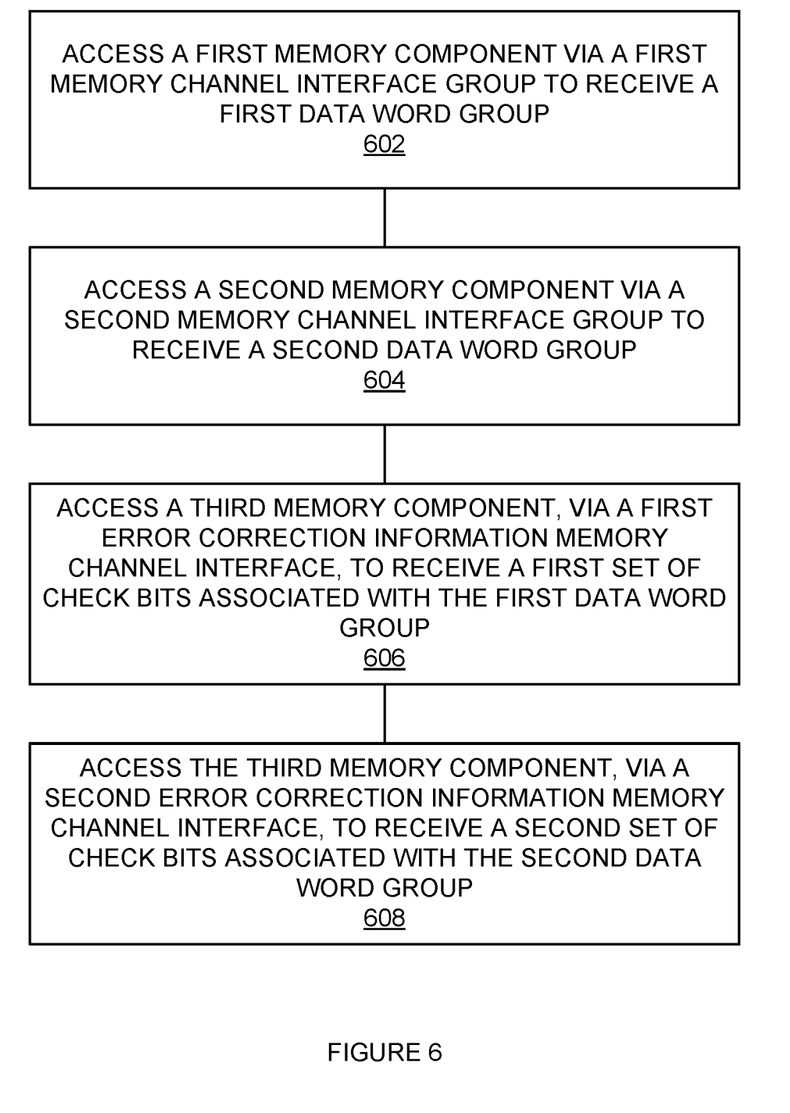
FIG. 6 a flowchart illustrating a method of operating a memory controller.

FIG. 6 is a flowchart illustrating a method of operating a memory controller. The steps illustrated in FIG. 6 may be performed by one or more of memory system 100, memory system 300, memory system 500, and/or their components. It should be understood that the steps illustrated in FIG. 6 may be performed in orders other than what is illustrated and/or performed in parallel. In addition, steps may not be dependent upon other steps in order to be performed.

A first memory component is accessed via a first memory channel interface group to receive a first data word group (602). For example, controller 100 may access, via memory access interfaces 111a, 112b, 113a, and 114b, at least memory component 121 to receive a first 64-bit data word burst. A second memory component is accessed via a second memory channel interface group to receive a second data word group (604). For example, controller 100 may access, via memory access interfaces 116a, 117b, 118a, and 119b, at least memory component 126 to receive a second 64-bit data word burst.

A third memory component is accessed, via a first error correction memory channel interface, to receive a first set of check bits associated with the first data word group (606). For example, controller 100 may access, via memory access interface 115a, memory component 125 to receive error correction code information associated with data in the first 64-bit data word burst. The third memory component is accessed, via a second error correction memory channel interface, to receive a second set of check bits associated with the second data word group (608). For example, controller 100 may access, via memory access interface 115b, memory component 125 to receive error correction code information associated with data in the second 64-bit data word burst.

Figure 7:
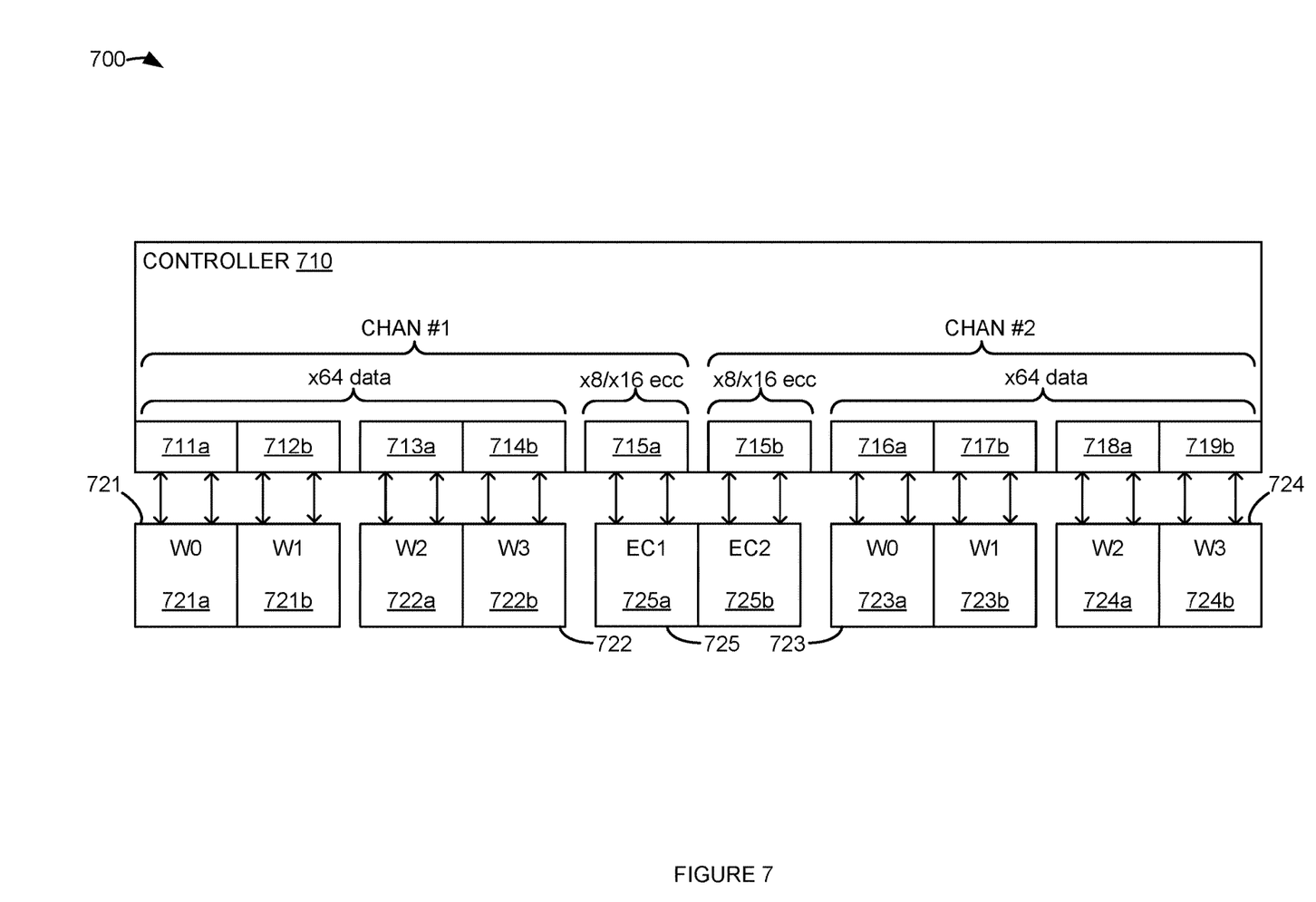
FIG. 7 is a block diagram illustrating a memory system with data devices operating in non-clamshell mode.

FIG. 7 is a block diagram illustrating a memory system with data devices operating in non-clamshell mode. The (non-clamshell) configuration of memory components 721-724 is illustrated in FIG. 7. For clarity, in FIG. 7, the command/address portions of the memory access channels have been omitted. FIG. 7 illustrates that: memory access interface 721a of memory component 721 communicates data W0 (e.g., a 16-bit word) with memory access interface 711a; memory access interface 721b of memory component 721 communicates data W1 with memory access interface 712b; memory access interface 722a of memory component 722 communicates data W2 with memory access interface 713a; memory access interface 722b of memory component 722 communicates data W3 with memory access interface 714b; memory access interface 723a of memory component 723 communicates data W0 (e.g., a 16-bit word) with memory access interface 716a; memory access interface 723b of memory component 723 communicates data W1 with memory access interface 717b; memory access interface 724a of memory component 724 communicates data W2 with memory access interface 718a; memory access interface 724b of memory component 724 communicates data W3 with memory access interface 719b. Thus, since each of memory components 721-724 is communicating 16 bit words, it should be understood that memory components 721-724 are operating in non-clamshell mode.

Memory component 725 is operated to provide respective error correction code data to wide memory channel #1 interface and wide memory channel #2 interface. The ability of memory component 725 to independently be operated by multiple (i.e., 2) instances of wide memory channel interfaces (i.e., via memory access interface 725a which is independent of memory access interface 725b) allows memory component 725 to independently provide the error correction information (EC1 and EC2, respectively) to each of these wider channels. Thus, two independent 72-bit (or 80-bit) channels (i.e., 64-bits of data and 8-bits of error correction code, or 64-bits of data and 16 bits of error correction code) may be provided using just five (5) memory components. For 8-bits of error correction code information, memory component 725 may be operated either in clamshell mode or non-clamshell mode (i.e., discard 8-bits). For 16-bits of error correction code information, memory component 725 is operated in non-clamshell mode.

The methods, systems and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited, to one or more elements of memory system 100, memory system 101, memory system 300, memory system 500, memory system 700, and their components. These software descriptions may be: behavioral, register transfer, logic component, transistor, and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 8:
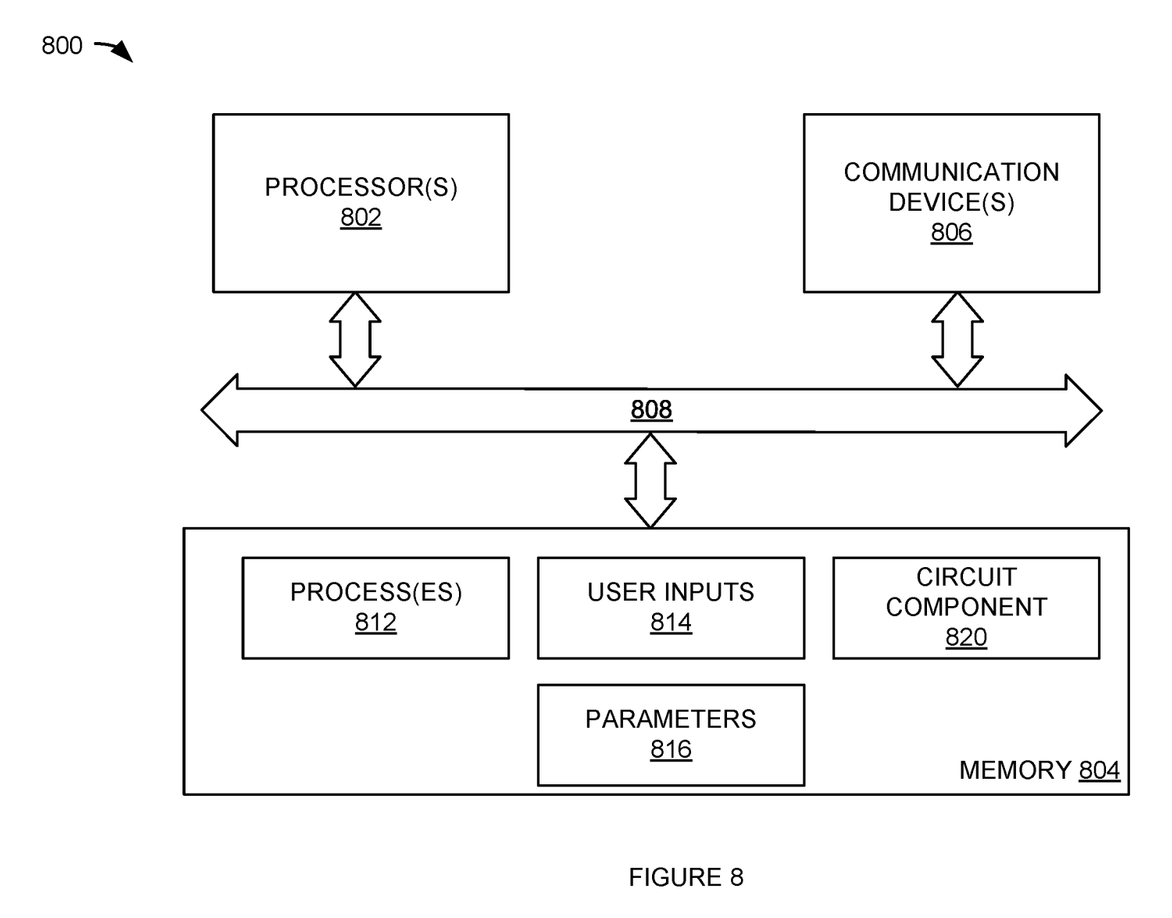
FIG. 8 is a block diagram of a processing system.

FIG. 8 is a block diagram illustrating one embodiment of a processing system 800 for including, processing, or generating, a representation of a circuit component 820. Processing system 800 includes one or more processors 802, a memory 804, and one or more communications devices 806. Processors 802, memory 804, and communications devices 806 communicate using any suitable type, number, and/or configuration of wired and/or wireless connections 808.

Processors 802 execute instructions of one or more processes 812 stored in a memory 804 to process and/or generate circuit component 820 responsive to user inputs 814 and parameters 816. Processes 812 may be any suitable electronic design automation (EDA) tool or portion thereof used to design, simulate, analyze, and/or verify electronic circuitry and/or generate photomasks for electronic circuitry. Representation 820 includes data that describes all or portions of memory system 100, memory system 101, memory system 300, memory system 500, memory system 700, and their components, as shown in the Figures.

Representation 820 may include one or more of behavioral, register transfer, logic component, transistor, and layout geometry-level descriptions. Moreover, representation 820 may be stored on storage media or communicated by carrier waves.

Data formats in which representation 820 may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email User inputs 814 may comprise input parameters from a keyboard, mouse, voice recognition interface, microphone and speakers, graphical display, touch screen, or other type of user interface device. This user interface may be distributed among multiple interface devices. Parameters 816 may include specifications and/or characteristics that are input to help define representation 820. For example, parameters 816 may include information that defines device types (e.g., NFET, PFET, etc.), topology (e.g., block diagrams, circuit descriptions, schematics, etc.), and/or device descriptions (e.g., device properties, device dimensions, power supply voltages, simulation temperatures, simulation models, etc.).

Memory 804 includes any suitable type, number, and/or configuration of non-transitory computer-readable storage media that stores processes 812, user inputs 814, parameters 816, and circuit component 820.

Communications devices 806 include any suitable type, number, and/or configuration of wired and/or wireless devices that transmit information from processing system 800 to another processing or storage system (not shown) and/or receive information from another processing or storage system (not shown). For example, communications devices 806 may transmit circuit component 820 to another system. Communications devices 806 may receive processes 812, user inputs 814, parameters 816, and/or circuit component 820 and cause processes 812, user inputs 814, parameters 816, and/or circuit component 820 to be stored in memory 804.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A controller, comprising:
a memory channel interface that includes a plurality of memory access interfaces, the plurality of memory access interfaces each including command and address functions that each operate independently of the command and address functions of other of the plurality of memory access interfaces; and
the memory channel interface including at least a first group of memory access interfaces to access a data word group, and including at least an error correction memory access interface to access one-half of a first memory component, the error correction memory access interface to access a first group of check bits associated with the data word group.

2. The controller of claim 1, wherein the plurality of memory access interfaces each further include data transfer functions that each operate independently of the data transfer functions of other of the memory access interfaces.

3. The controller of claim 2, wherein a first one of the first group of memory access interfaces is to be connected to a second memory component and a third memory component.

4. The controller of claim 3, wherein the second memory component and the third memory component are to be operated in a clamshell mode.

5. The controller of claim 2, wherein the data word group consists of a first number of bits and the first group of check bits consists of a second number of bits, the first number of bits to be eight (8) times the second number of bits.

6. The controller of claim 2, wherein the first memory component is to be operated in a clamshell mode.

7. The controller of claim 2, wherein the first group of memory access interfaces includes four (4) memory access interfaces to access 64-bit data word groups.

8. A controller, comprising:
a first memory channel interface to access at least a first memory component to communicate a first data word group, the first memory channel interface comprising a first plurality of memory access interfaces; and
an error correction data channel interface to access a second memory component, the error correction data channel interface including a first memory access interface, the first memory access interface to be connected to the second memory component, the first memory access interface to access a first one-half of the second memory component to communicate a first group of check data associated with the first data word group.

9. The controller of claim 8, wherein the second memory component is to be operated in a clamshell mode.

10. The controller of claim 8, wherein the at least first memory component is to be operated in a clamshell mode.

11. The controller of claim 8, wherein the second memory component is to also be connected to an another controller.

12. The controller of claim 11, wherein the another controller is to access a second one-half of the second memory component.

13. The controller of claim 12, wherein the first plurality of memory access interfaces and the first memory access interface each include respective command, address, and data transfer functions.

14. The controller of claim 13, where the respective command, address, and data transfer functions of the first plurality of memory access interfaces and the first memory access interface each operate independently of the command, address, and data transfer functions of each other of first plurality of memory access interfaces and the first memory access interface.

15. A method of operating a controller, comprising:
accessing at least a first memory component via a first memory channel interface group, to receive a first data word group, the first memory channel interface group including a first plurality of command and address functions that operate independently of the command and address function of other memory channel interfaces; and
accessing a first one-half of a second memory component to receive a first set of check bits associated with the first data word group via a first error correction memory channel interface.

16. The method of claim 15, wherein each of the first memory channel interface group further include a respective plurality of data transfer functions that operate independently of the data transfer functions of other of the first memory channel interface group.

17. The method of claim 16, wherein the accessing, to receive the first set of check bits, is performed concurrently with the accessing via the first memory channel interface group.

18. The method of claim 15, wherein the first data word group consists of a first number of bits and the first set of check bits consists of a second number of bits, the first number of bits to be eight (8) times the second number of bits.

19. The method of claim 15, wherein the first data word group consists of a first number of bits and the first set of check bits consists of a second number of bits, the first number of bits to be four (4) times the second number of bits.

20. The method of claim 15, wherein the at least first memory component includes a third memory component.

* * * * *